April 7, 1936. J. H. THARP 2,036,895
GAUGE
Filed April 29, 1935 4 Sheets-Sheet 4
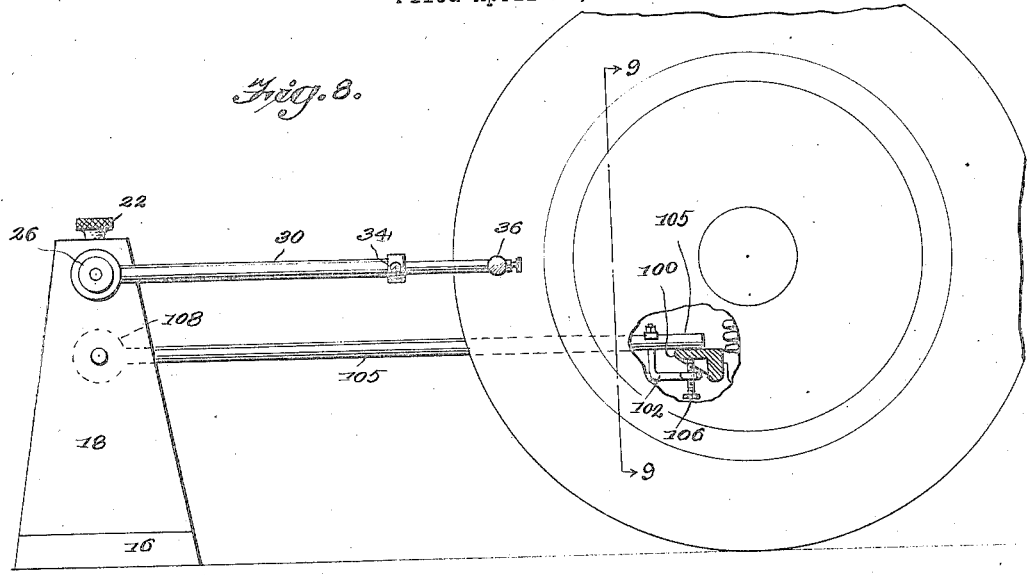
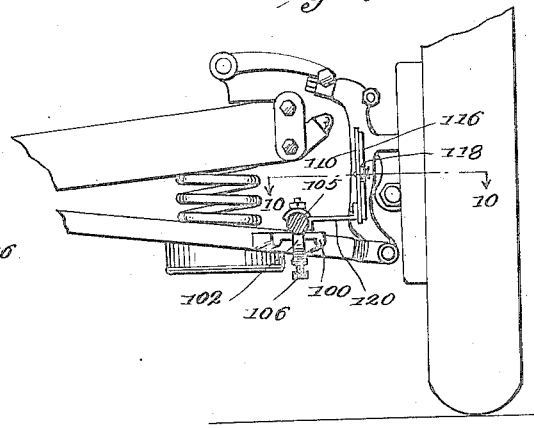
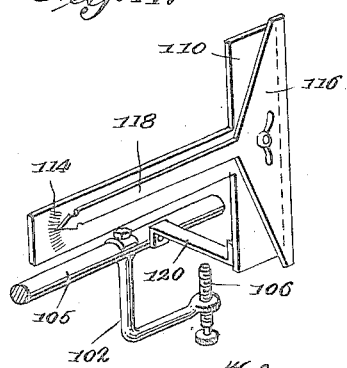
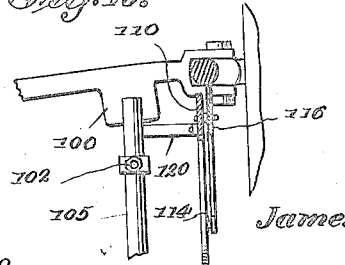
Inventor
James H. Tharp.
L. Edw. Doherty
Attorney Patented Apr. 7, 1936

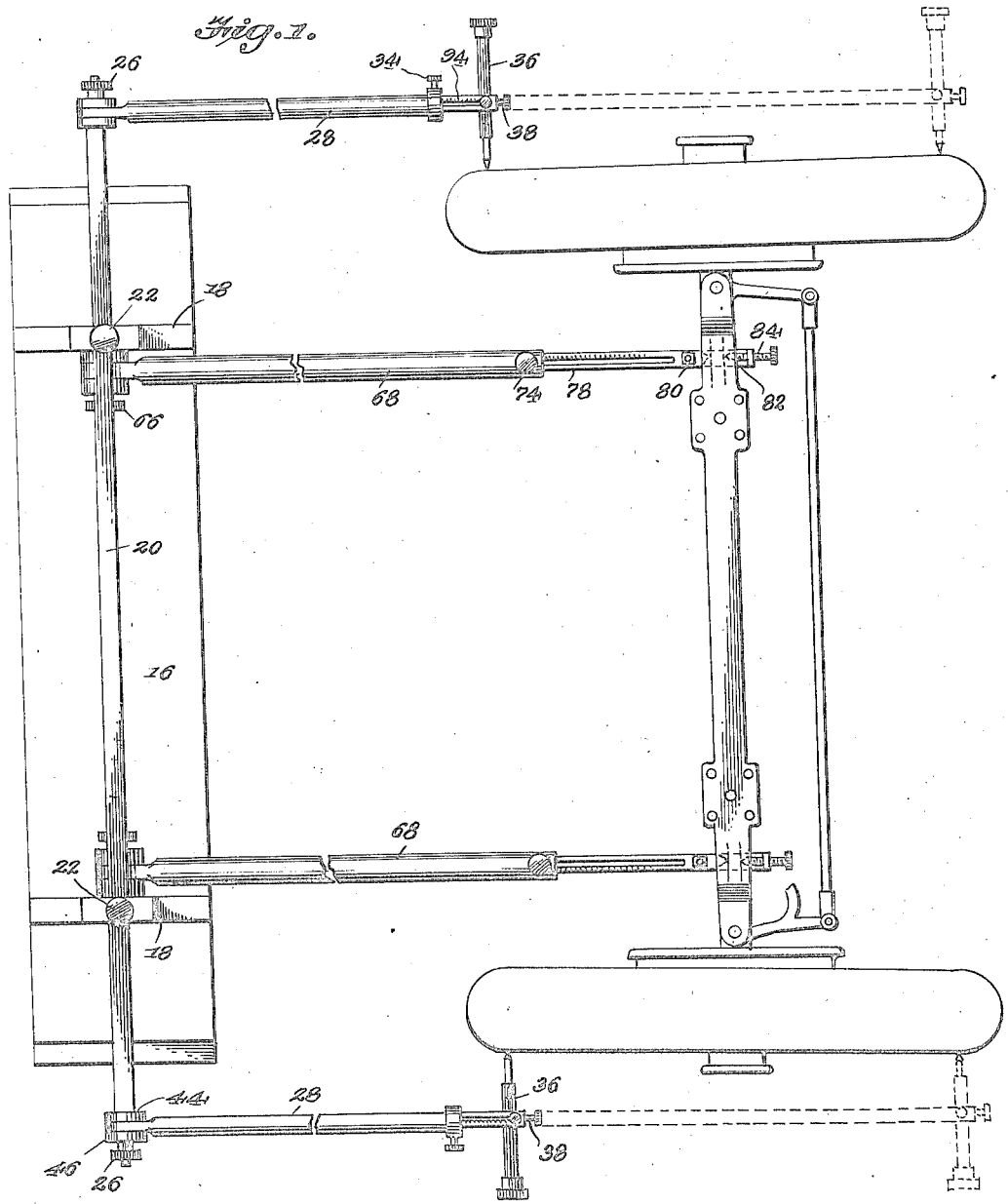

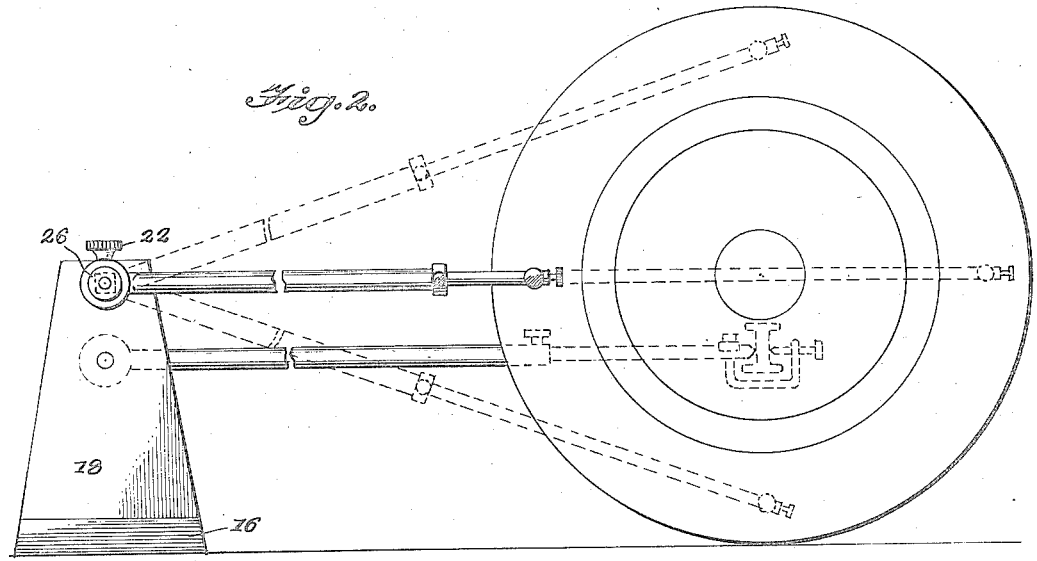
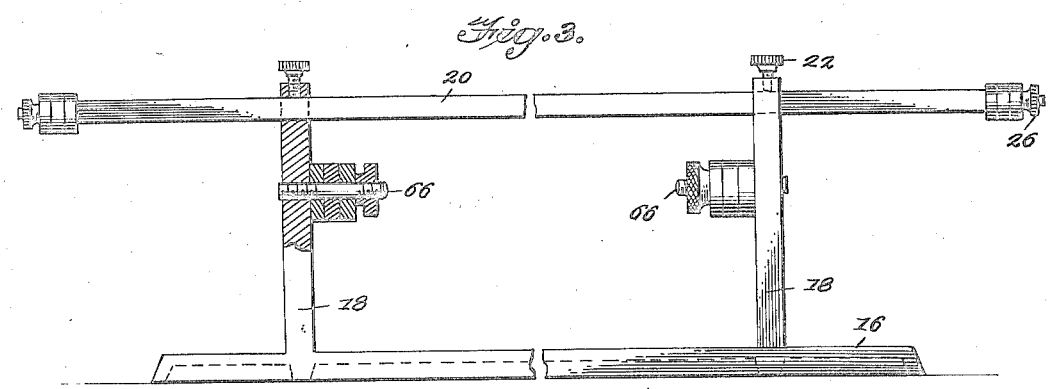
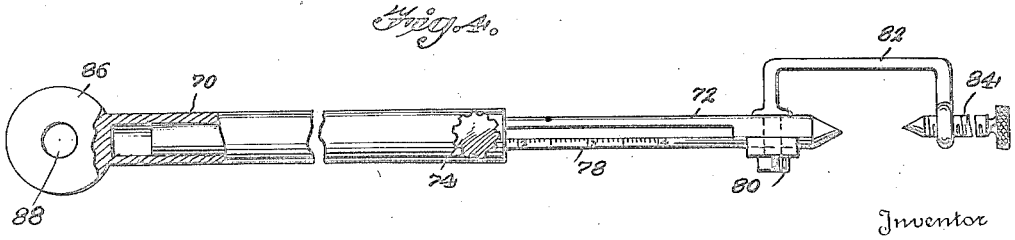

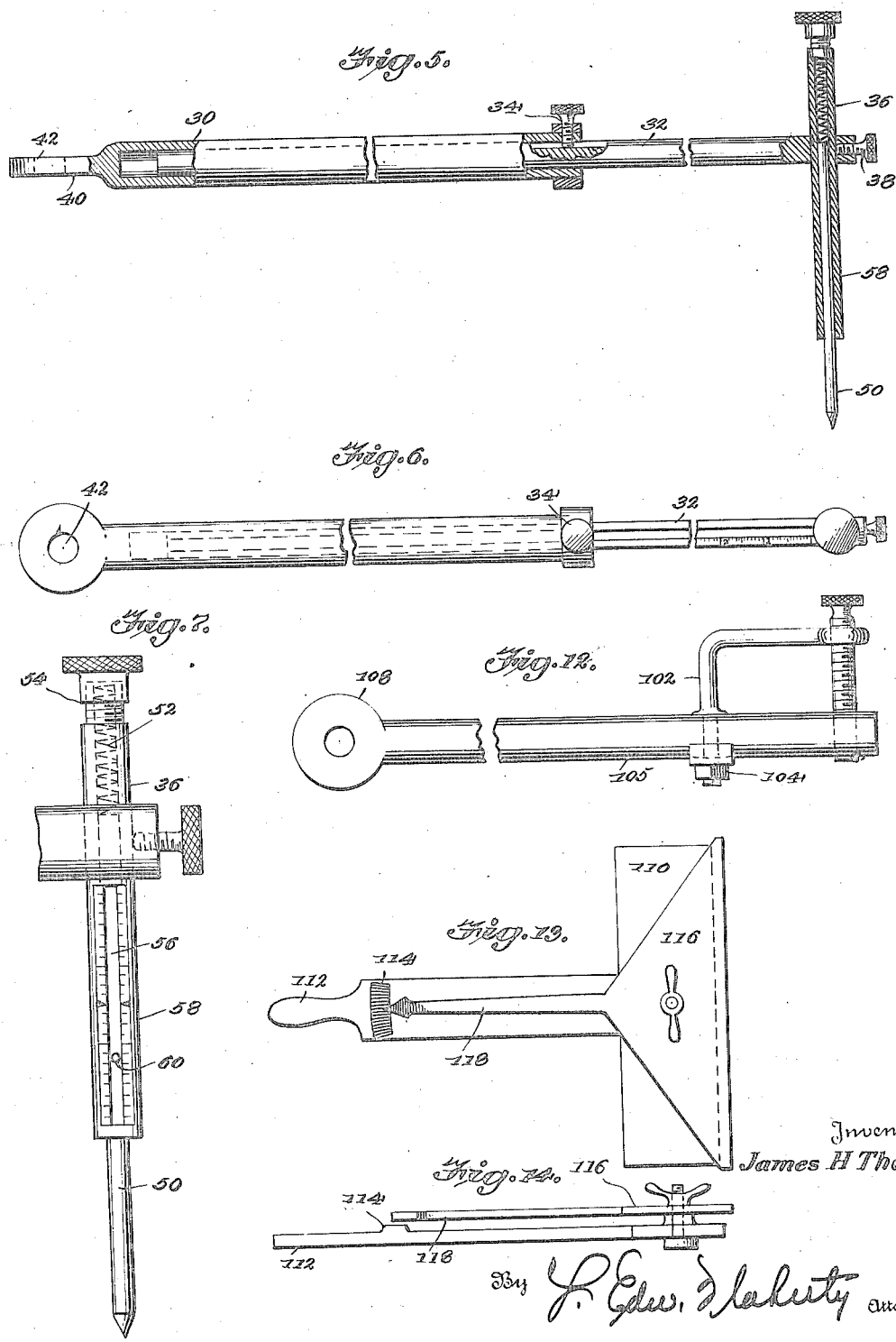

2,036,895

UNITED STATES PATENT OFFICE 2,036,895

GAUGE

James H. Tharp, Abilene, Tex., assignor of one-half to Charles W. Coats, Baird, Tex.

Application April 29, 1935, Serial No. 18,903

6 Claims. (Cl. 33—203)

The present invention relates to a gauge and more particularly to a gauge especially adapted for use in gauging the toe-in and camber of motor vehicle wheels.

One of the objects of the present invention is to provide a gauge of this type, which by means of a simple operation the toe-in as well as the camber of motor vehicle wheels may be gauged and properly adjusted.

A still further important object of the invention is to provide a gauge of this character which is especially adapted for use in connection with the so-called knee action wheels.

A further important attribute of the invention will be found to reside in the particular construction of the gauge and the novel manner in which the same is securely fastened to the motor vehicle, in order to obtain an accurate measurement of the toe-in and camber of the motor vehicle wheels.

A still further important object of the invention will be found to reside in the particular and novel construction of the device, which permits of the same to be used for such measurements on any type of motor vehicle.

Another important object of the present invention is to provide an axle caster gauge which may be used in combination with the toe-in and wheel camber gauging device, or if so desired used separately therefrom.

Other objects include low cost of manufacture, simplicity in operation and durability.

In the accompanying drawings, forming a part of this application and in which like numerals are employed to designate corresponding parts throughout the same, Figure 1 is a top plan view of the gauge showing the same in use in connection with the standard type of motor vehicle axle and in position for measuring the toe-in of the motor vehicle wheels, Figure 2 is a side elevational view of the device illustrating the manner in which the device is used for measuring the camber of motor vehicle wheels, Figure 3 is a rear elevational view, Figure 4 is a perspective view partly in section of one of the telescopic supporting and securing arms, Figure 5 is a top plan view partly in section of one of the pivotally mounted telescopic measuring arms, Figure 6 is a front elevational view of one of the telescopic measuring arms, Figure 7 is a detail perspective view of the measuring device secured to the telescopic arm, Figure 8 is a side elevational view of a modified form of the invention which is especially constructed and adapted for use in connection with the gauging of wheels embodying the newly developed knee-action construction, Figure 9 is a fragmentary front elevational view of the front portion of a motor vehicle, embodying the knee action construction, illustrating the manner in which the gauge is connected to the axle portion thereof, Figure 10 is a horizontal sectional view of Figure 9 taken on line 10—10 thereof, Figure 11 is a fragmentary perspective view illustrating the manner in which the caster gauge is secured to the supporting arm of the device, Figure 12 is a fragmentary perspective view of the gauge securing and supporting arm which is used in the modified form of the invention and in connection with motor vehicles embodying the knee action construction, Figure 13 is a side elevational view of a hand-operated camber gauge, Figure 14 is a top plan view thereof, Figure 15 is a plan view of a further modification of the invention especially adapted for motor vehicles equipped with knee action.

In the accompanying drawings, wherein for the purpose of illustration there is shown preferred embodiments of the invention, and referring more particularly to Figures 1 to 7 inclusive, the reference numeral 16 generally designates the base portion of the supporting standard which is provided with spaced upstanding columns 18.

In the upper portions of the columns 18 there are provided apertures through which extends a rod 20 projecting as clearly illustrated in Figure 3, beyond the outer edges of the columns. A screw threaded aperture extends downwardly in the top portion of the columns 18 into the apertures therein, in which there is screw-threaded a set screw 22 for securing the rods 20 in a predetermined position with respect to the supporting columns 18. As clearly illustrated, the apertures in the columns 18 are disposed with respect to the base of the support, in such a manner that the rod 20 is parallel with the base. The ends of the supporting rods 20 are provided with screw threaded reduced portions, on which there is screw-threaded a knurl-headed nut 26.

On the reduced portions of each end of the supporting arm 20 there is pivotally mounted a telescopic gauge arm 28. As clearly illustrated in Figure 5, the gauge arm 28 comprises a hollow section 30 into which there is slidable the solid gauge supporting arm 32. The hollow section 30 is provided with a screw threaded aperture adjacent one end thereof into which there is screw threaded the set screw 34 which contacts with the slidable arm 32 to maintain the same in a predetermined position.

As shown in Figure 5, the outer end of the arm 32 is provided with a transversely extending aperture into which there is slidable a gauge 36. The gauge 36 is adjustable within the transversely extending aperture and secured at predetermined positions therein by means of the set screw 38 which is screwed in the end of the gauge arm 32 and communicating with the transversely extending bore or aperture therein.

The other end of the hollow portion 30 of the gauge supporting arm is provided with a reduced portion 40 having a centrally disposed aperture 42 therein.

As clearly illustrated in Figures 1 and 3, the gauge supporting arms 26 are pivotally mounted on the reduced portion of the arm 20 between a pair of washers 44 and 46 and are maintained at a predetermined lateral position thereon, through the medium of the knurled nuts 26.

Referring now to Figure 7 it will be seen that the gauge 36 has slidable therein a pointer 50 which is normally maintained in its outermost position by means of the spring 52 which contacts the inner end thereof, and an adjusting screw 54 which is screw-threaded in one end of the gauge. The gauge is provided with a longitudinally extending slot 56 on each side of which there is provided an appropriate scale 58 and the relative position of the pointer 50 is indicated through the medium of the pin 60 on the pointer which extends through the slot 56. It is to be noted in this connection that this pin 60 also retains the pointer 50 within the gauge proper.

The columns 18, are provided as clearly illustrated in Figure 3, with oppositely disposed transverse screw threaded apertures into which there is screw threaded, the pins 66. Pivotally mounted on the pins 66 are telescopic arms 68, which as clearly shown in Figure 4, include a hollow section 70 into which there is telescopically arranged, and slidable, a clamp supporting rod 72. The telescopically mounted rod 72 is secured at predetermined positions in the hollow section 70, by means of the knurl-headed set screw 74 which is screw threaded in an aperture in the end of the hollow section 70.

The slidable clamp supporting rod 72 is provided with a scale 78 thereon, for measuring and indicating the length of the telescopic arm at predetermined positions. Adjacent the outer free end of the rod 72, there is a transversely extending aperture, into which there is secured by means of the nut 80, a U-shaped clamp 82. As clearly illustrated in Figure 4, the U-shaped clamp 82 in the free upstanding arm portion thereof has screw-threaded therein a set screw 84. On the free end of the hollow section 70 there is an integral reduced portion 86 which is provided with a centrally disposed aperture 88.

As clearly illustrated in Figures 1 and 3, the telescopic arms 68 are pivotally mounted on the pins 66 and held in a predetermined position with respect to the support by means of the knurled nuts 88.

As is clearly illustrated, when it is desired to gauge and adjust the toe-in and the camber of the front wheels of a motor vehicle of standard construction, which does not embody the knee action construction, the support is placed in front of the motor vehicle, and the telescopic arms 68 are extended to a lateral position and the clamp 82 as clearly illustrated in Figure 1, secured by means of the screws 84 to the front axle of the motor vehicle. This not only secures the support in position, but also maintains the rod 20 at a predetermined stationary position with respect to the front wheels. In measuring the toe-in as illustrated in Figure 1, the telescopic gauge supporting arms are raised to a horizontal position, the slidable rod 32 being extended to a point adjacent the outer front portion of the tire, where the pointer 40 as illustrated in Figure 1, will be urged in an outermost position until it contacts the outer portion of the tire. A reading on the scale is taken at this point. The rod is then extended to the rear portion of the tire where the pointer 50 contacts the outer portion of the tire and a reading is taken at this point. The difference between the first and second readings will indicate the toe-in of the wheel. The same procedure is followed with respect to the other wheel, it being noted in this connection that the telescopic gauge supporting arms are maintained in a predetermined horizontal position by means of the set screws. It will thus be seen that if the toe-in of the wheels of the motor vehicle is not correct, the same can be properly adjusted.

Referring now to Figure 2, it will be seen that the camber of the wheels may be gauged and adjusted in substantially the same manner by positioning the gauge supporting rod at upper and lower points on the outer portion of the wheel on the vertical axis thereof.

As shown in Figure 1, the support 16 is maintained in parallel relationship with respect to the front axle of the motor vehicle by means of the scales 78 on the slidable rod 72.

Referring now to Figures 8 to 12 inclusive it will be seen that the gauge is especially constructed for measuring the toe-in and camber of motor vehicles which are provided with the knee action type of wheels. In the usual knee action type of wheels, the axle is provided adjacent the spindle with a jack-pad 100. In order that the gauge may be used on any type of car, including those that are equipped with knee action constructions, there is provided as clearly indicated in Figure 12, a different type of arm for securing the gauge to the motor vehicle. The arm comprises as shown in Figure 12, an L-shaped bracket 102 secured to one end thereof by means of the screw nut and bolt 104. The other end of the bracket is provided with a set screw 106. The free end of the arm has a flat reduced apertured portion 108 which in the same manner as the other arm is pivotally mounted on the spindles or pins 66.

As illustrated in Figure 8, the L-shaped bracket 102 is clamped to the jack pad by means of the set screws 106 thereby securely maintaining the support at a predetermined position with respect to the front portion of the motor vehicle. In the same manner, as described with respect to the Figures 1 to 7 inclusive, the toe-in and camber of the wheels may be gauged and adjusted.

Obviously, the toe-in and camber adjustments may be made on any type of car simply by using the proper supporting arm, it only being necessary to remove one set of arms.

Referring now to Figures 11, 13 and 14 it will be seen that there is provided a gauge which may be used independently or as illustrated in Figure 2 may be fastened to the supporting arm for measuring the caster. This gauge comprises a T-shaped support 110 having an integral handle 112. Adjacent the handle there is provided an arcuate scale 114. On the T-shaped support 110 there is pivotally mounted a V-shaped gauge 116 having a gauge arm 118 integral therewith and extending over the scale 114.

It will become apparent that when the gauge is not in use, the pivotally mounted arm may be raised to a vertical position to the end that the gauge may be conveniently placed in an out-of-the-way position.

Figure 15 shows a further modified form of the invention which is adapted for use in connection with motor vehicles employing knee action construction. In this form of the invention there is provided a scale 111 pivotally mounted at the mid-point of the rod 20 which is movable over a scale 113. To the outer end of the pointer there is secured a rod 107, which rod as shown in Figure 15, is adapted to be inserted between the free ends of the tie rods 115 secured to the plate 117. It will be seen that when the scale reading is zero, the tie rods are in the proper position for subsequent gauging and adjusting the toe-in and camber of the wheels.

While there is shown for the purpose of illustration a preferred embodiment of the invention, it is to be specifically understood that it is capable of various changes and modifications without departing from the spirit and scope thereof and it is intended therefore that only such limitations shall be imposed thereon as are indicated in the prior art or in the appended claims.

What is claimed is:

1. A wheel gauge for measuring the toe-in and camber of motor vehicle wheels, comprising an upstanding support, pivotally mounted telescoping arms on said support for securing said support in a predetermined spaced relation to the front portion of the motor vehicle, telescoping pivotally mounted gauge supporting arms on said support, and resiliently mounted gauges on each of said gauge supporting arms.

2. A wheel gauge for measuring the toe-in and camber of motor vehicle wheels, comprising an upstanding support, pivotally mounted telescoping arms on said support, means for securing the free ends of said telescoping arms to the front axle of a motor vehicle, a scale on each of said telescopic arms for adjusting the same to a predetermined length, telescopic pivotally mounted gauge supporting arms on said supports, and resiliently mounted gauges on the free ends of each of said gauge supporting arms.

3. A wheel gauge for measuring the toe-in and camber of motor vehicle wheels, comprising an upstanding support, pivotally mounted telescoping arms on said support, means for securing the free ends of said telescoping arms to the front axle of a motor vehicle, a scale on each of said telescopic arms for adjusting the same to a predetermined length, telescopic pivotally mounted gauge supporting arms on said supports, and resiliently mounted gauges on the free ends of each of said gauge supporting arms, a scale on each of said gauge supporting arms for adjusting the same to a predetermined length.

4. A wheel gauge for motor vehicles comprising a support including a base and spaced upstanding columns, a pivotally mounted telescoping arm on each of said columns, means on the free ends of each of said arms for securing the arm to the axle of a motor vehicle, a scale on each of said telescopic arms, a rod extending transversely of said upstanding columns, and a pair of spaced, pivotally mounted telescoping gauge supporting arms on said rod, scales on said telescopic gauge supporting arms for measuring the length thereof, and gauges mounted on the free ends of said gauge supporting arms, said gauges being provided with a slidable pointer adapted to engage the outer portion of a motor vehicle tire.

5. A wheel gauge for motor vehicles comprising a support including a base and spaced upstanding columns, a pivotally mounted telescoping arm on each of said columns, means on the free ends of each of said arms for securing the arm to the axle of a motor vehicle, a scale on each of said telescopic arms, a rod extending transversely of said upstanding columns, and a pair of spaced, pivotally mounted telescoping gauge supporting arms on said rod, scales on said telescopic gauge supporting arms for measuring the length thereof, gauges mounted on the free ends of said gauge supporting arms, said gauges being provided with a slidable pointer adapted to engage the outer portion of a motor vehicle tire, and resilient means in said gauge for normally urging said pointer to its outermost position.

6. A wheel gauge for motor vehicles comprising a support including a base and spaced upstanding columns, a pivotally mounted telescoping arm on each of said columns, means on the free ends of each of said arms for securing the arm to the axle of a motor vehicle, a rod extending transversely of said upstanding columns and a pair of spaced pivotally mounted telescoping gauge supporting arms on said rod, scales on said telescoping gauge supporting arms for measuring the length thereof, laterally extending gauges mounted on the free ends of said gauge supporting arms, a pointer pivotally mounted at the mid-point of the transversely extending rod, a stationary scale secured to said rod and associated with said pointer, and a laterally extending rod secured to said pointer adapted to be positioned between the free ends of the tie rods of a motor vehicle for determining the position thereof.

JAMES H. THARP.